June 3, 1969　　　H. ETTISCHER　　　3,447,440
FILM ADVANCEMENT CONTROL MEANS
Filed May 25, 1967
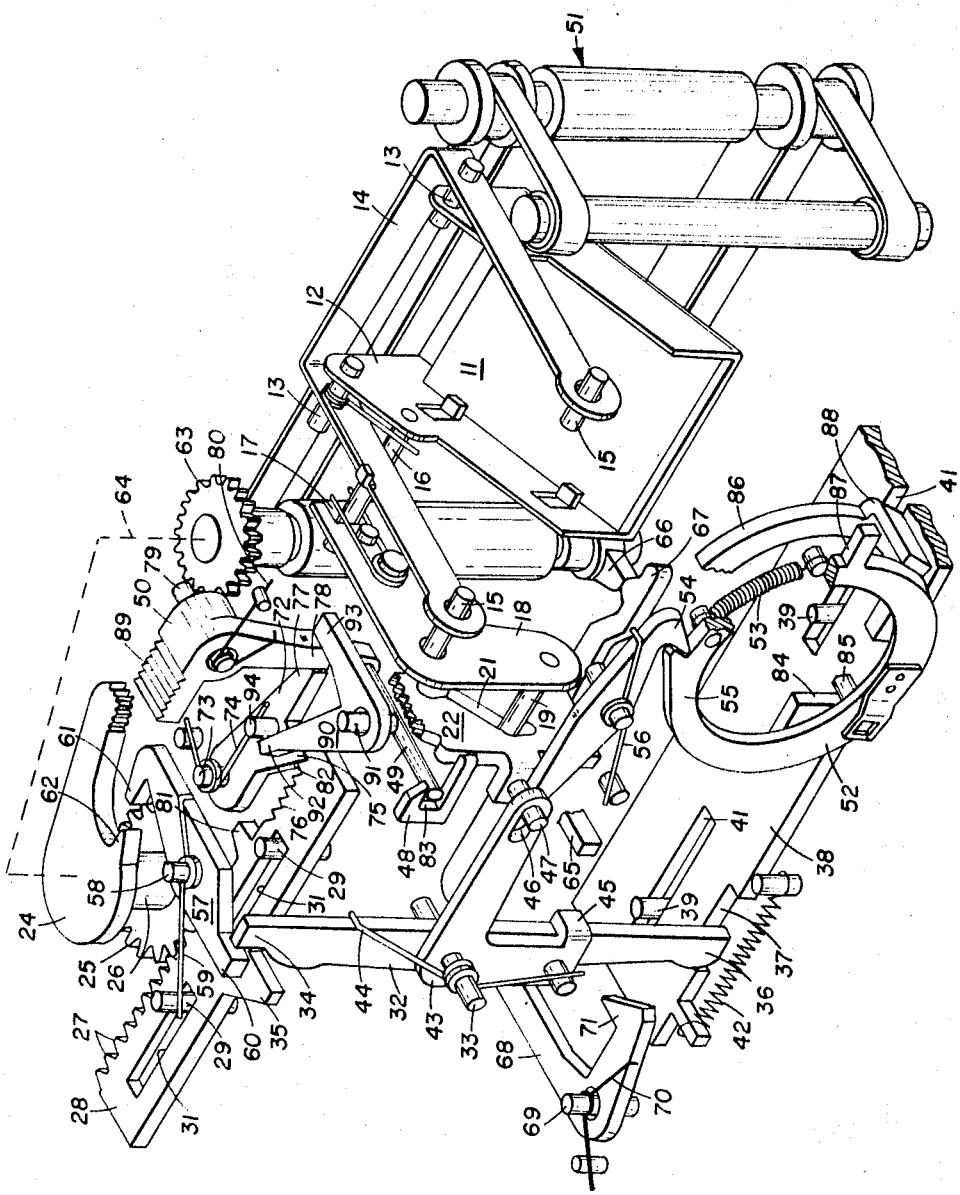
HELMUT ETTISCHER
INVENTOR.
BY Steve W. Greenbaum
Robert W. Hampton
ATTORNEYS

United States Patent Office 3,447,440
Patented June 3, 1969

3,447,440
FILM ADVANCEMENT CONTROL MEANS
Helmut Ettischer, Ruit, Kreis Esslingen, Germany, assignor to Eastman Kodak Company, Rochester, N.Y.
Filed May 25, 1967, Ser. No. 641,189
Int. Cl. G03b 19/12
U.S. Cl. 95—42                        7 Claims

ABSTRACT OF THE DISCLOSURE

A film advancement control mechanism, particularly suitable for single lens reflex cameras, including an automatic control system for coordinating the operation of a film advancing device with the performance of the camera mechanisms associated with film exposure, and also including manually operable means for selectively disabling the automatic control system.

---

Reference is made to U.S. patent application Ser. No. 524,034, Single Lens Reflex Camera, filed on Feb. 1, 1966, by Helmut Ettischer.

The present invention relates to improved means for coordinating the operation of a film advancing mechanism of a camera with the functioning of other movable components thereof, such means being particularly appropriate for use in cameras of the single lens reflex type.

It is well known to provide photographic cameras, including single lens reflex cameras, with metering means for arresting advancement of the film therein when an unexposed film area has been moved into the exposure position and for disabling the metering means to allow further advancement of the film only after the camera shutter has been operated to expose that film area. However, the association of such a film metering system with the relatively complex movable mirror and focal plane shutter structure employed in single lens reflex cameras has generally been accomplished by means of corresponding complex and relatively expensive mechanisms. Accordingly, the present invention is directed to performing these functions by means of an integrated mechanism which is comparatively simple and correspondingly inexpensive to produce, while at the same time being rugged and reliable. Additionally, unlike typical prior mechanisms for accomplishing the same general objectives, the subject construction insures not only that the shutter has completed its operation before the film can be advanced, but also that the mirror has been returned to its operative viewing position so that the subsequent advancement of the film can in no way interfere with the mirror positioning mechanism, or with a mechanism which may be operated thereby to adjust a lens diaphragm. Furthermore, this improved construction also incorporates novel means for enabling the metering mechanism to be disabled manually by the operation of a single externally accessible member which serves both as the manually operable disabling member and also as the shutter trigger member.

Various means for accomplishing the invention will be apparent from the following detailed description of a preferred embodiment thereof, as illustrated by the accompanying drawing in which various elements not pertinent to an understanding of the invention have been omitted. For more specific details of a focal plane shutter mechanism appropriate for use in such a camera, reference is made to commonly assigned pending U.S. application Ser. No. 524,034, filed in my name on Feb. 1, 1966, and relating to a camera generally similar to the illustrated preferred embodiment of the present invention. Similarly, for further details of the movable viewfinder mirror structure illustrated by the accompanying drawing, reference may be made to commonly assigned pending U.S. application Ser. No. 498,437, filed in my name and that of Theo Baisch on Oct. 20, 1965, and relating to that specific structure.

Referring now to the drawing, the viewfinder mirror 11 is mounted in mirror support member 12, which is pivotally supported by shaft members 13 extending inwardly from a generally U-shaped bracket 14, rotatable about stationary shaft members 15. A stud 16 extends outwardly from mirror support member 12 and is received by slot 17 at the adjacent end of control lever 18, which is also pivotally supported by one of the shafts 15. At the end of the control lever opposite slot 17, a pin 19 projects from the lever and into an angular cam slot 21 in control slide member 22, which is supported for vertical sliding movement by means not shown. Accordingly, as the control slide member moves downwardly from its illustrated position, pin 19 displaces control lever 18 in a counterclockwise direction, as viewed in the drawing; whereby the mirror support member is moved in a clockwise direction from its illustrated angular viewing position, in which it is aligned with the camera lens system (not shown) to a generally horizontal position out of alignment with the lens system.

An externally accessible film advancing lever 24, attached to a gear 25, is supported for reciprocatory movement about the axis of shaft 26. Gear 25, in turn, meshes with gear teeth 27 along the edge of rack member 28, supported for sliding movement by pins 29 extending through slots 31. Accordingly, the rack member 28 is moved to the right by counterclockwise movement of lever 24 and to the left by clockwise movement thereof, as viewed in the drawing.

A vertical lever 32, pivotally supported on shaft 33, is located with its upper end 34 in alignment with a lateral projection 35 on rack member 28 and with its lower end 36 received in notch 37 of slide plate 38, which is slidably supported by pins 39 extending through slots 41. A spring 42, attached to slide plate 38, biases it toward the right, thereby exerting a counterclockwise influence on lever 32.

Adjacent lever 32, an angular arm 43 is also pivotally supported on shaft 33 and is biased in a clockwise direction relative to lever 32 by a spring 44, which tends to maintain ear 45 of arm 43 in contact with the adjacent edge surface of lever 32. At the end of arm 43 opposite ear 45, a slot 46 receives a pin 47, extending forwardly from control slide 22 and thereby coordinating the vertical position of control slide 22 with the angular position of arm 43.

After an exposure has been made, the various illustrated camera components assume the positions illustrated in the drawing, i.e. lever 24 is in its extreme clockwise position; rack member 28 is all the way to the left; slide plate 38 is moved to the right by spring 42; lever 32 is in its extreme counterclockwise position; arm 43 has moved control slide 22 to its raised position in which hook member 48 thereof is in releasable latching engagement with pin 49 supported on trigger member 50; and the focal plane shutter of the camera, indicated generally by numeral 51, is in an unwound or uncocked condition. Also, at this stage of the camera's operating cycle the rotatable diaphragm adjusting ring 52 of a variable aperture diaphragm device, not shown, is latched in its illustrated position against the clockwise influence of spring 53, by a pivotally supported latch arm 54 urged into latching engagement with tooth 55 on the periphery of the ring by a spring 56; whereby the diaphragm is adjusted to its maximum aperture.

The film metering mechanism of the camera includes a locking arm 57 pivotally supported by a shaft 58 and biased in a counterclockwise direction by spring 59. When lever 32 is positioned as described above, its upper end 34 engages end 60 of arm 57 and maintains the arm in its depicted position, in which tooth 61, at its opposite end, is beyond the path of movement of lug 62 on film advancing lever 24.

As the operator moves lever 24 in a counterclockwise direction from its illustrated position, a rotatable film take-up member, not shown, is thereby rotated by means of a unidirectional clutch arrangement to wind film onto the take-up member, in a manner well known in the camera art, so that the film is advanced by one exposure frame in response to movement of the lever from its illustrated position to its extreme counterclockwise position. Simultaneously, as is known in other cameras, the counterclockwise rotation of lever 24 is transmitted to shutter winding gear 63 to wind the shutter, by means of a gear train or the like, not shown but represented by broken line 64. The shutter winding operation is completed as lever 24 reaches the end of its film advancing movement, whereupon the shutter mechanism is latched in wound condition by a releasable latch member partially shown at 65. As gear 63 is rotated to wind the shutter, cam member 66, engaged with end 67 of latching lever 68, is also rotated out of its illustrated position, which it assumes only when the shutter is unwound. Accordingly, lever 68 is rotated slightly in a counterclockwise direction about pivot pin 69 by spring 70 to move latch tooth 71 into engageable relation with lever 32.

To insure that lever 24 must be moved through a sufficient angle to advance an unexposed film area into exposure position and to complete the shutter cocking operation, a pawl member 72 is pivotally mounted on stud 73 and is biased in a clockwise direction by spring 74 to urge tooth 75 of the pawl member toward and into engagement with the adjacent ratchet teeth 76 on rack member 28. When tooth 75 is so engaged with one of the teeth 76, the end portion 77 of the pawl member provides an abutment for depending leg 78 of trigger member 50, which is pivotally supported on shaft 79 and biased in a clockwise direction by spring 80. By this arrangement, it will therefore be apparent that lever 24 is movable only in a counterclockwise direction due to the unidirectional engagement of tooth 75 with teeth 76, until the lever has moved sufficiently to complete the film advancing and shutter cocking operations, whereupon the rack member will have moved sufficiently to advance lug 81 into contact with the sloped edge surface 82 of the pawl member to disengage pawl member tooth 75 from teeth 76. As this is accomplished, the counterclockwise rotation of pawl member 72 by lug 81 moves its end portion 77 out of alignment with depending leg 78 of trigger member 50, which then rotates slightly in a clockwise direction to a position defined by the engagement of pin 49 with the end of latching notch 83 in hook member 48. Such movement of trigger member 50 causes leg 78 thereof to trap the end of pawl member 72 behind leg 78, so that lever 24 and rack member 28 can be returned to their respective initial positions.

During the above-described film advancing movement of lever 24, the corresponding movement of rack member 28 rotates lever 32 in a clockwise direction, thereby displacing slide plate 38 to the left against the influence of spring 42 to move upstanding lug 84 on slide member 38 out of engagement with pin 85 on ring 52 and beyond the arcuate movement path of the pin. Additionally, such movement of lever 32 tensions spring 44 to exert a clockwise force on arm 43, which remains in its illustrated position due to the retention of control slide 22 in its raised position by latch member 48 engaged with pin 49. As the film advancing lever 24 reaches the end of its counterclockwise movement, latching lever 68 is in engageable alignment with lever 32, as previously explained, and is cammed aside by lever 32, against the resilient force of spring 70, so that tooth 71 engages the vertical lever 32 and releasably latches it in its extreme clockwise position. Hence, when film advancing lever 24 is returned to its initial position, with locking arm 57 no longer under the influence of lever 32, tooth 61 is cammed past lug 62 and engages the rearward edge of the lug to prevent subsequent counterclockwise movement of film advancing lever 24, thereby completing the film advancing operation.

In preparation for exposing the advanced film, diaphragm presetting ring 86 is rotatably adjusted, either manually or automatically, so that as ring 52 is subsequently rotated in a clockwise direction to reduce the aperture defined by the diaphragm, such rotation will be blocked by the engagement of lug 87 with ear 88 at a position related to scene illumination and film sensitivity. To effect an exposure, the operator then depresses the serrated arm 89 of trigger member 50, thereby rocking the trigger member about shaft 79 to allow pawl member 72 to rengage teeth 76 of rack member 28 and to withdraw pin 49 from hook member 48 so that control slide 22 can move downwardly under the influence of tensioned spring 44. Upon the commencement of such downward movement of control slide 22, latch arm 54 is encountered almost immediately by pin 47 and is released from ear 55, whereupon diaphragm control ring 52 is rotated in a clockwise direction by spring 53, to establish the preselected diaphragm setting. As the control slide continues to move downwardly, mirror 11 is moved to its inoperative horizontal position by virtue of cam slot 21 as previously described, and, as the slide approaches its lowermost position, the adjacent edge of arm 43 engages and depresses the end of latch member 65 to release cocked shutter 15. During the exposure of the film, the slide member 22 remains in its lower position due to the continued engagement of lever 32 by latching lever 68, which is released by cam 66 when the shutter has become unwound following the completion of the exposure. When this occurs, spring 42 returns slide plate 38 to its illustrative position, resetting diaphragm control ring 52 by the engagement of lug 84 with pin 85, and rotating lever 32 in a counterclockwise direction. During such rotation of lever 32, ear 45 of arm 43 is engaged by lever 32 and urges control slide 22 upwardly to restore the mirror to its initial condition. This is accomplished before lever 32 engages and releases locking arm 57 to allow the commencement of a subsequent film advancing movement of lever 24.

If the operator should again depress trigger member 50, before having advanced the film, control slide 22 will be unlatched but will remain in its raised position, having no effect on the camera mechanism, due to the position of lever 32. Furthermore, since shutter 51 can be operated only when it is fully cocked and when control slide 22 moves almost to its extreme lower position to release shutter latch member 65, it will be seen that depression of trigger 50 during advancement of the film will cause the shutter to be released only if the film advancing operation has been completed, at which time the previously exposed area has been moved beyond exposure position. Accordingly, unlike many typical double exposure prevention mechanisms, it is unnecessary to block movement of trigger mechanism 50 between exposures. Therefore, in accordance with the invention, the trigger member can be employed advantageously in a dual capacity; serving both to release shutter 51 to effect an exposure and also to allow the film metering mechanism to be disabled manually at any stage of the film advancing operation, so that film advancing lever 24 can be returned to its initial position or can be operated to advance the film without its being exposed.

The employment of trigger member 50 to disable the metering mechanism is accomplished by means of a bifurcated lever 90, pivotally supported on stud 91, with legs 92 and 93 of that lever located respectively in adjacent relation to pin 94 on pawl member 72 and depending leg 78 of the trigger member. During the normal camera operating cycle, lever 90 performs no operative function and dies not interfere with the movement of pawl member 72 by lug 81, which merely moves pin 94 away from leg 92 during the final stage of the film advancing movement of lever 24. However, if trigger member 50 is depressed before the film advancing movement of lever 24 has been completed (i.e. when pawl member 72 is in its illustrated position in engagement with teeth 76), arm 93 is engaged by depending leg 78 of the trigger member and lever 90 is thereby rotated in a clockwise direction so that leg 92 engages pin 94 and displaces pawl member 72 to disengage tooth 75 from teen 76, thus allowing rack member 28 to be moved to the left by clockwise movement of lever 24. Therefore, if the advancing lever is in an intermediate position when the end of the film is reached, depression of trigger member 50 will allow lever 24 to be returned to its initial position before the film is rewound and removed from the camera. Similarly, if a malfunction should occur, e.g. as a result of tearing or jamming of the film, the film advancing lever 24 can be released and operated in the same manner. Additionally, since tooth 61 of locking arm 57 does not engage lug 62 unless film advancing lever 24 has been moved to its extreme counterclockwise position to move vertical lever 32 into latched engagement with tooth 71 of latching lever 68, this arrangement allows the film advancing lever 24 to be moved repeatedly between its initial position and an intermediate position while trigger member 50 is depressed, whereby the film will be advanced progressively, as the unlatched control slide 22 oscillates without engaging latch member 65 and influencing the closed camera shutter. Thus, if the operator wishes to install an already partially exposed roll of film in the camera, the exposed portion of the film can be advanced past the lens system by depressing trigger member 50 and reciprocating lever 24 through less than its full movement range, after which the mechanism will function normally following a complete film advancing movement of lever 24 with the trigger 50 released.

Although the foregoing description relates to a specific embodiment of the invention, it is obvious that variations and modifications thereof can be effected within the spirit and scope of the invention. Accordingly, the present disclosure is to be considered as illustrative and not as limiting the scope of the invention which is defined by the following claims.

I claim:
1. In a single lens reflex camera comprising:
   a film advancing member movable to advance an elongate strip of film loaded into said camera;
   a viewfinder mirror movable between a viewing position, and an inoperative position;
   a shutter operating trigger movable to effect exposure of an area of said film aligned with a predetermined exposure location;
   mirror positioning means for moving said mirror to said inoperative position during each exposure of said film, and to said viewing position following each exposure of said film; and
   metering means operatively engageable with said film advancing member to arrest movement thereof when said film has thereby been advanced by a predetermined distance to align an unexposed area of said film with said exposure location; the improvement comprising:
      disengaging means operable to disengage said metering means from operative engagement with said film advancing member to allow subsequent advancement of said film by a predetermined distance to align another unexposed area thereof with said exposure location, and control means for coordinating the operation of said disengaging means with the movement of said mirror to operate said disengaging means after said mirror has moved to said viewing position.
2. The invention defined by claim 1 including disabling means operable by manual movement of an externally accessible operating member for disabling said metering means to allow said film to be advanced continuously by movement of said advancing member while said metering means are so disabled.
3. The invention defined by claim 2 in which said externally accessible operating member comprises said trigger.
4. A photographic camera comprising:
   a film advancing member movable in a film advancing direction from a first position to a second posititon, and in a return direction from said second position to said first position;
   pawl means operatively engageable with said member to prevent movement thereof in said return direction until said member has moved in said film advancing direction to said second position;
   retention means for releasably retaining said member in said first position;
   a trigger movable manually to an operative position against the influence of resilient means urging said trigger to an inoperative position;
   shutter means adapted for operation in response to movement of said trigger to said operative position when said member is in said first position;
   retention releasing means responsive to the completion of such shutter operation for releasing said retention means to allow movement of said member from said first position; and
   pawl disabling means for operatively disengaging said pawl means from said member while said trigger is in said operative position.
5. A single lens reflex camera comprising:
   a movable film advancing member adapted to advance a strip of photographic film in said camera past a predetermind exposure location;
   metering means releasably engageable with said film advancing member to block movement thereof when said film has been advanced thereby through a predetermined distance;
   a shutter operable in response to movement of a trigger device;
   a movable control member;
   means for moving said control member to a first position during each operation of said shutter, and to a second position in response to the completion of each operation of said shutter;
   a viewfinder mirror movable between a viewing position in alignment with said exposure location, and an inoperative position out of alignment with said exposure location;
   motion translating means operatively connecting said control member with said mirror whereby said mirror is moved to said inoperative position by movement of said control member to said first position, and to said viewing position by movement of said control member to said second position; and
   release means for releasing said metering means from engagement with said film advancing member in response to movement of said control member to said second position to allow a subsequent advancement of said film through said predetermined distance.
6. In a photographic camera adapted to accommodate an elongate strip of photographic film, said camera comprising:
   a movable film advancing member adapted to advance said film intermittently;
   metering means for releasably arresting movement of said film advancing member after each successive advancement of said film thereby through a predetermined distance;
   a trigger member manually movable from an inoperative position to an operative position;
   a shutter adapted to be operated in response to movement of said trigger member to said operative posi- tion while movement of said film advancing member is arrested by said metering means;

means responsive to the completion of each operation of said shutter for releasing said metering means to allow a subsequent advancement of said film and for precluding a subsequent operation of said shutter until said film has been so advanced through said predetermined distance; the improvement comprising:

means for disabling said metering means in response to movement of said trigger to said operative position after said shutter has operated and before said film has thereafter been advanced by said film advancing member through said predetermined distance.

7. In a single lens reflex camera of the type having a viewfinder mirror and a shutter operative to expose film in the camera, the combination comprising:

a mirror mechanism for automatically positioning the viewfinder mirror in an inoperative position during operation of the shutter, and a viewing position following operation of the shutter;

a movable film advancing member;

blocking means operatively engageable with said film advancing member to prevent film advancing movement thereof, and disengageable from said film advancing member to permit film advancing movement thereof;

release means operated in response to operation of the shutter for operatively disengaging said blocking means from said film advancing member; and means for delaying operation of said release means until said mirror has been positioned in said viewing position following operation of the shutter.

References Cited

UNITED STATES PATENTS 3,385,189   5/1968   Hennig et al. _____ 95—31

NORTON ANSHER, *Primary Examiner.*

R. L. MOSES, *Assistant Examiner.*

U.S. Cl. X.R.

95—31